United States Patent Office 3,114,668
Patented Dec. 17, 1963

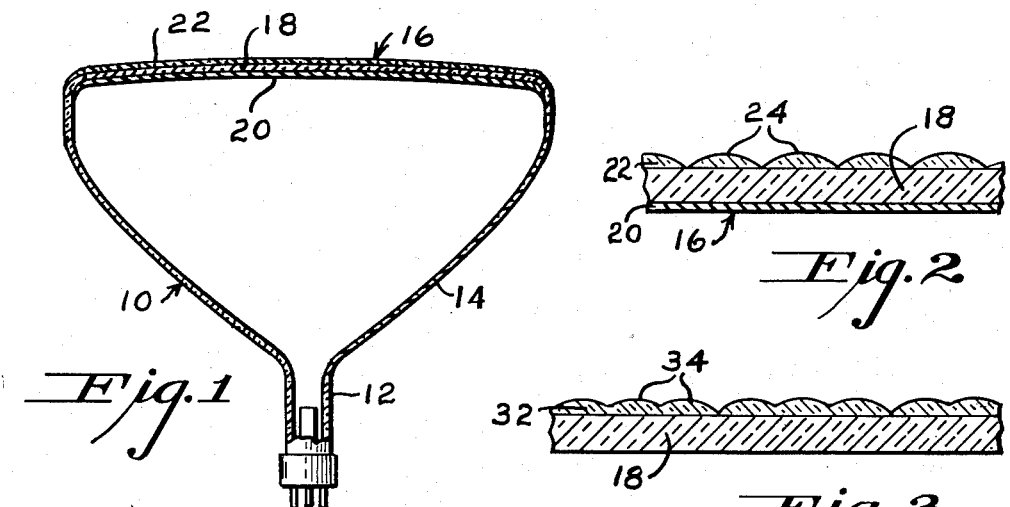
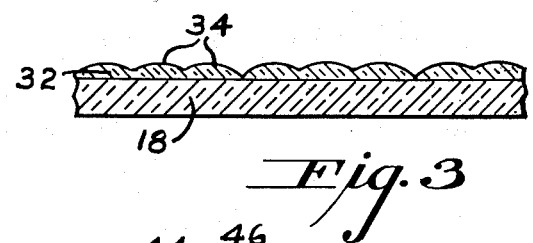
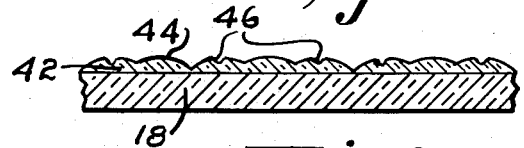
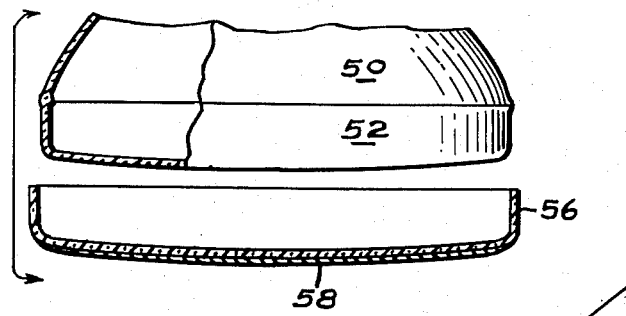
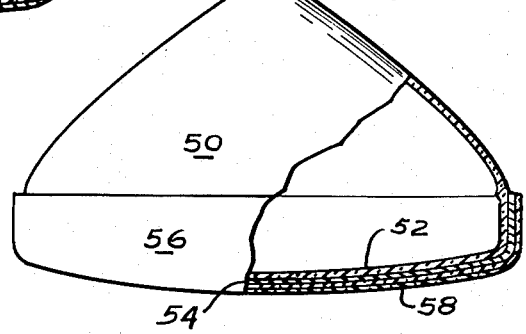

3,114,668
COATED OPTICAL SCREENS AND THEIR PRODUCTION
Glen A. Guiles, Pine City, N.Y., assignor to Corning Glass Works, Corning, N.Y., a corporation of New York
Filed May 26, 1961, Ser. No. 112,930
4 Claims. (Cl. 161—116)

This invention relates to reduction of specular reflection from glass surfaces, particularly from the viewing surface of an optical screen such as a television picture tube screen. It is especially concerned with improving a vitrified, alkali silicate coating produced in a droplet pattern to reduce specular reflection, and with means for providing such improvement.

Specular reflection is direct reflection of light such as normally occurs from a smooth glass surface. It imparts to the reflecting surface a glossy appearance or glare that is particularly objectionable on a viewing screen, such as a television tube screen.

The basic principle of reducing specular reflection with a vitrified, droplet pattern coating is described in a copending application, S.N. 50,762, filed August 19, 1960, in the names of R. J. Casciari and W. C. Palmer, and assigned to a common assignee. In accordance with the teaching of that application, an aqueous solution of alkali silicate is deposited in droplet form on a glass surface, e.g. as a spray. The droplet pattern coating thus produced is dried and baked at an elevated temperature to provide a vitrified or glassy coating of corresponding pattern and surface contour. The application further teaches reduction of soda content in the vitrified coating in order to impart long-term stability against development of "bloom" on the coating surface.

A simple alkali silicate coating, as described by way of illustration in the Casciari et al. application, is quite effective in reducing specular reflection from an optical or image producing screen such as a television tube screen. Experience has demonstrated, however, that an appreciable decrease in picture or image resolution may occur when such a coated screen is substituted for a conventional smooth surface glass screen.

Image or picture resolution is basically the degree of clarity, sharpness, discernibility of detail, or lack of diffusion in a picture or image reflected or projected by a screen. The difficulty in precisely measuring an essentially subjective characteristic of this nature is apparent. Consequently, various means of evaluating resolution are recognized even for a particular type of screen such as a television tube screen.

A purely subjective type of evaluation determines the ability of a group of viewers to discern a difference, if any, between identical pictures appearing on two adjacent screens. Such an evaluation may correlate both the percentage of a group discerning a difference and the degree of difference which they discern.

A commonly used, objective type measurement is referred to as "small area detail contrast." In this evaluation method, the light output received by a meter from a bright or scanned spot on a screen is compared with the output received from an adjacent black or unscanned spot. In another type of evaluation, a test screen is viewed through an optical meter and compared, by means of such meter, with a series of known patterns having assigned values in terms of lines of resolution per inch. The other factor of interest, specular reflection, is customarily measured in terms of gloss or glare by a form of gloss meter.

While acceptable for certain purposes, diminished picture resolution is an apparent disadvantage that becomes particularly serious in television tube screens. The result is a commercial need for a coating having the advantageous characteristics of a simple alkali silicate coating, but further providing improved picture or image resolution. A primary purpose of this invention is to provide an improved coating and coated product that meets this need.

I have discovered that the desired improvement of picture or image resolution may be accomplished by incorporating a minor addition of boric oxide in a simple alkali silicate coating. Photographic studies demonstrate a tendency for simple alkali silicate coatings to have small, sharp-sided, craters dotting the coating surface. These scatter emitted light and thus effect a loss in resolution. In contrast, similar studies indicate the cratering tendency to be minimized in a boric oxide modified coating.

A further purpose then is to provide such improvement by modification of an alkali silicate coating composition. Another purpose is to provide a modified coating solution that produces such improved alkali silicate coating, and that is adapted to application by spray methods.

The present invention is, therefore, embodied in an optical screen comprising, as its viewing surface, a thermally vitrified coating having a droplet pattern and composed of a sodium borosilicate material. A further embodiment is a coating solution for production of such vitrified coating that consists essentially of an aqueous sodium silicate solution containing as an additive a small but effective amount of boric oxide-containing material to improve surface smoothness of the vitrified coating.

In the glass art, the term "borosilicate glass" is understood to means a silicate glass containing at least 5% $B_2O_3$. For present purposes, the term is employed somewhat more broadly to indicate simply that boric oxide is a component in the vitrified coating, i.e., without reference to a minimum amount of 5%.

The invention is further described with reference to the accompanying drawing in which, FIG. 1 is a schematic representation, largely in section, of an image-producing cathode ray tube embodying the invention.

FIGS. 2–4 are greatly enlarged fragmentary views in section of a viewing screen corresponding to that of FIG. 1, and illustrating differences in coating patterns.

FIG. 5 is a side elevational view, partly broken away to show construction, of a television picture tube envelope illustrating a preferred embodiment of the invention, and FIG. 6 is a fragmentary, exploded view, partly in side elevation and partly in sectional elevation, of the tube envelope of FIG. 5, prior to lamination.

The cathode ray tube of FIG. 1, generally designated by the numeral 10, consists of a neck section 12, a funnel section 14, and a screen or panel section 16. Inasmuch as the present invention is concerned essentially with screen section 16, electron emitting components and other parts normally associated with the neck and funnel portions of the tube are omitted or shown schematically.

Screen 16 includes a normally smooth-surfaced glass panel 18 having applied to its inside surface a phosphor coating 20 that is capable of producing an image when suitably scanned by an electron beam. In accordance with the present invention, a vitrified, sodium borosilicate coating 22 is provided on the exterior or viewing surface of glass panel 18.

Coating 22 is characterized by a continuous succession of alternating protuberances 24 and valleys of microscopic size. It is created by thermal drying and vitrification of numerous solution droplets to effect their consolidation into a substantially continuous coating. This is generally illustrated in the drawings of FIGS. 2–4, which are greatly enlarged and distorted as to proportions in order to better illustrate characteristic features and configuration of the coating surface.

FIG. 2 illustrates an idealized coating configuration wherein regularly spaced droplets are consolidated into a vitrified coating 22 of corresponding pattern. In actual practice, droplets of solution will ordinarily be randomly distributed with at least some overlapping, as well as a small degree of uncoated or exposed glass surface in thin coatings. Furthermore, during vitrification, the solution droplets will tend to flatten out and produce a coating 32 that is in the form of discs, long radii lenses, or platelets 34, as shown illustratively in FIG. 3. As explained hereafter, the primary consideration, for purposes of specular reflection and image resolution, is a surface of gradually changing irregular contour whereby incident light rays are reflected in a random or diffused manner, while transmitted light rays are not sharply bent or refracted to any substantial extent.

FIG. 4 illustrates a surface coating condition which is believed to be the source of resolution loss in a simple alkali silicate coating. As shown illustratively, coating 42 has an irregular droplet pattern 44 but also has small craters or hollows 46 in this characteristic surface contour. Comparative pictures, both magnified photographs and electron photomicrographs, show that such craters are generally much more prevalent in simple alkali silicate coatings than in the present sodium borosilicate type coatings after vitrification. For example, there may be several small craters per droplet in the former, but only an occasional droplet with a crater in the latter.

It is believed that surface irregularities, illustratively shown as craters 46, result from the formation of water vapor bubbles at the surface of the coating during thermal vitrification. It appears that these bubbles burst leaving a crater-shaped hollow, but that the vitrifying material does not thereafter become sufficiently soft to flow into a smooth surface contour. Rather, the crater-like contour of the burst bubbles freezes into the coating surface. The sharp angle edges of such craters result in wide angle refraction of transmitted light rays, and consequent blurring or picture resolution loss in a transmitted picture or image. I have no explanation as to why the addition of boric oxide corrects or minimizes this condition. However, the photographic studies referred to above consistently indicate that the present sodium borosilicate type coatings are markedly superior in this respect.

It will be understood that the dimensions of protuberances 24 may be varied depending on the particular application or article involved. For example, protuberances having a height of about 5–20 microns and a maximum diameter of 5–100 microns have been suggested as critical for providing optimum picture resolution with a maximum amount of reduction in specular reflection from a television tube viewing screen. Optimum configuration for any particular screen may be determined in accordance with standard illuminating procedures for determining light transmission and reflection characteristics. The desired dimensional values may then be produced in accordance with the method described subsequently.

In accordance with a preferred embodiment, the novel reflection reducing coating of this invention is employed in conjunction with a dual or laminated panel television picture tube of the type described in S.N. 776,320, filed November 25, 1958, now abandoned, in the name of R. J. Casciari and assigned to a common assignee. Prior to development of this laminated construction, it was standard commercial practice to mount a plastic or strengthened glass shield in front of the picture tube screen for safety purposes. However, this shield and tube assembly is not well adapted to achieving the benefits of the present invention. Application of the coating to the tube screen is ineffective to reduce specular reflection from the shield surface. On the other hand, there tends to be a serious loss of picture resolution with a coating on the shield which is spaced from the picture produced on the screen. Proper configuration of the coating, e.g. provision of valleys having long radii intermediate the nodular elements, can alleviate this condition to some extent. However, optimum benefits of the invention are achieved when it is employed in conjunction with a laminated tube screen as in FIGS. 5–6.

The tube envelope of FIG. 5, constructed in accordance with the Casciari teaching, includes a funnel portion 50 and an integral panel portion 52. A skirted glass panel 56 having the same configuration as panel 52 but somewhat larger dimensions is accurately aligned with panel 52 and laminated thereto by applying a laminant 54, such as an epoxy resin between the panel members and adherent to their opposed surfaces. Reference is made to the Casciari application for further details regarding the laminating process and the materials employed.

Prior to lamination of the panels, the exterior surface of the outer or auxiliary panel 56 is provided with a glare reducing coating 58 as shown in FIG. 6. Coating 58 may correspond identically in configuration and composition with coating 22, described earlier in connection with FIG. 1. FIG. 6 shows coated panel 56 preparatory to insertion of panel 52 of the tube envelope and lamination of the panels 52 and 56.

As explained in the Casciari application, a laminant is chosen with a refractive index matching that of the panels. Thereby the exterior surface of the panel 52 and the interior surface of panel 56 are essentially eliminated in an optical sense. Thus, for optical purposes, the laminated tube may be considered as providing a laminated screen having only two effective surfaces, reflection reducing coating 58 being on the outer surface. In manufacturing a television picture tube from the envelope shown in FIG. 5, an electron sensitive phosphor is applied to the inner surface of the screen in any conventional manner.

The greatly strengthened construction provided by the laminated, skirted panels obviates the need for providing a safety shield intermediate the coated viewing screen and the viewer. Consequently, the described combination provides a picture tube in which optimum picture clarity is combined with desired safety features.

Since the coating of the present invention is essentially a modification of that described in the Casciari-Palmer application, it may conveniently be applied and treated in accordance with the methods set forth in detail in that application. Essentially, this comprises the steps of (1) surface cleaning, (2) application of coating solution by spraying, (3) thermal vitrification, and (4) partial removal of soda or sodium ion as by $SO_2$ treatment. If necessary, the surface of the glass screen to be coated may be cleaned either by a detergent wash or by lightly etching the glass surface in a weak fluoride etching solution. The cleaned surface is then carefully rinsed and dried before application of the coating solution by spraying in a manner controlled to provide a desired droplet pattern. The glass, with the solution thus applied, is then subjected to a cyclic thermal treatment to effect drying and vitrification of the coating. Preferably the thermal cycle involves heating to a temperature of about 375° C. to 400° C. in a period of about one-half hour and holding at the maximum temperature for about one hour. The vitrified coating may be stabilized against weathering, that is rendered more chemically durable, by partial dealkalization. This is conveniently accomplished by introduction of a small amount of sulfur dioxide during the latter stages of coating vitrification. Conveniently, the vitrification process is carried out in a conventional glass lehr with sulfur oxide being introduced in the lehr atmosphere during the latter part of the baking schedule.

The single essential deviation for present purposes is in formulation of the coating solution. In accordance with my invention, a source of boric oxide is introduced into the coating solution in small amount. In preparing a solution for spray application, I have found it most convenient to prepare separately an aqueous solution of sodium silicate and a corresponding solution of a borate material and to mix these solutions in about equal amounts prior to spraying. In the appended claims, however, the term "coating solution" refers to the mixed solutions as actually applied. A variety of sodium silicate solutions are commercially available, but I prefer one containing approximately one-third solid material with the $Na_2O:SiO_2$ mol ratio being about 1:3.75.

Various soluble borate materials may be employed in producing the borate solution, including anhydrous $B_2O_3$, boric acid, or a sodium borate such as borax. In adapting my new solutions to spray application, I have found that the concentration of boric oxide must be limited to avoid rapid gelation when solutions are mixed. Accordingly, it is desirable to maintain the concentration of $B_2O_3$ at about 1% or less by weight in the mixed solution. This corresponds to a maximum of about 8% $B_2O_3$ by weight in the vitrified coating. This maximum value will increase somewhat in the case where $Na_2O$ is removed by $SO_2$ or other dealkalizing treatment.

While much smaller $B_2O_3$ contents provide some degree of improvement for present purposes, the degree of improvement appears to increase with increase in boric oxide content, at least to the extent that it is compatible in solution. The boric oxide content, therefore, is referred to as small, that is on the order of 10% or less in the coating, but effective, that is effective to minimize crater formation and loss of picture resolution.

By way of further illustrating the present invention and its advantages, the following exemplary description is provided:

A group of 23" maximum diameter television tube panels or caps corresponding to cap 56 in FIG. 5 were provided with thermally vitrified droplet coatings. Solution application and vitrification were in accordance with the description above and identical in each case, except for the coating solution employed. One panel (#1 in table below) was sprayed with an alkali silicate solution prepared by mixing 60 cc. of the sodium silicate solution identified above with 40 cc. of water and 10 cc. of an emulsified silicone. Each of six additional panels (Nos. 2–7) was sprayed with a boric oxide type solution. The solutions were prepared by mixing 60 cc. (79.2 grams) of the sodium silicate solution with 100 cc. of a boric oxide solution, the solution in each case containing either anhydrous $B_2O_3$ or crystalline boric acid in an amount shown in the table below. In addition to the boric oxide material contents in the coating solutions, the table also shows comparative measurements of reflection, resolution and durability (micrograms or mg. $Na_2O$ extracted/cm.² surface in a humidity chamber test) for the screens prepared in accordance with this example. For comparison, data on a laminated, uncoated, polished panel screen is included as No. 8.

Table

| No. | $H_3BO_3$ | $B_2O_3$ | Reflection | Resolution | Durability |
|---|---|---|---|---|---|
| 1 | | | 14 | 93 | 1.50 |
| 2 | 1 | | 14 | 193 | 0.31 |
| 3 | | 1 | 20 | 193 | 0.23 |
| 4 | 1.5 | | 14 | 193 | 0.16 |
| 5 | | 1.5 | 20 | 193 | 0.23 |
| 6 | 2 | | 14 | 193 | 0.15 |
| 7 | | 2 | 8 | 193 | 0.27 |
| 8 | | | 150 | 260 | |

Both specularity of reflection (Ref.) and image resolution (Res.) data are in terms of lines per inch and represent correspondence to a standard pattern. Thus a series of patterns (2, 8, 14, 20 etc. lines per inch) are projected onto the test panel and reflected to a viewer. The last pattern capable of being distinguished is the value shown for reflection. This then is a qualitative measure of the capability for diffusion of reflected light, an excellent diffusing surface rendering only a coarsely lined pattern distinguishable.

The resolution data is similarly obtained for a transmitted pattern, which simulates a projected image. Here the patterns are successively 93, 138, 193, 260, etc. lines per inch, are transmitted in unison, and the pattern having the highest number of distinguishable lines selected to represent the resolution. The data is, of course, qualitative, but clearly shows the distinct advantage in resolution provided by the present coating with comparable diffusion of reflected light.

It will be observed that a distinct improvement in durability is also provided by the new coating. Durability is determined by exposure in a 95% relative humidity chamber at 125° F. for 72 hours. The exposed sample is then washed and $Na_2O$ in the wash determined as mg. $Na_2O$ per square centimeter of exposed surface.

What is claimed is:

1. An optical screen comprising, as its viewing surface, a thermally vitrified coating having a droplet pattern and composed of a sodium borosilicate material.

2. A screen in accordance with claim 1 wherein the boric oxide content of the vitrified coating is up to about 10% by weight of the coating.

3. In a television picture tube, a screen comprising two parallel layers of glass laminated together with a plastic material and having on its viewing surface a thermally vitrified coating in a droplet pattern consisting essentially of a sodium borosilicate material.

4. In the production of a stabilized coating to decrease specular reflection from a glass surface wherein a droplet coating of an alkali silicate solution is thermally vitrified on the glass surface, the improvement that comprises adding boric oxide to the coating solution.

References Cited in the file of this patent

UNITED STATES PATENTS

| 2,293,529 | Bedford | Aug. 18, 1942 |
| 2,428,357 | Cohen | Oct. 7, 1947 |
| 2,601,123 | Moulton | June 17, 1952 |